United States Patent [19]

Suzuki et al.

[11] Patent Number: 5,262,086
[45] Date of Patent: Nov. 16, 1993

[54] LIQUID CRYSTAL COMPOUNDS

[75] Inventors: Yoshiichi Suzuki; Horiyuki Mogamiya; Ichiro Kawamura, all of Tokyo, Japan

[73] Assignee: Showa Shell Sekiyu Kabushiki Kaisha, Tokyo, Japan

[21] Appl. No.: 903,953

[22] Filed: Jun. 26, 1992

Related U.S. Application Data

[60] Division of Ser. No. 785,877, Nov. 4, 1991, Pat. No. 5,184,847, and a continuation-in-part of Ser. No. 785,877, Nov. 4, 1991, which is a continuation of Ser. No. 533,813, Jun. 6, 1990, abandoned.

[30] Foreign Application Priority Data

Jun. 6, 1989 [JP] Japan ................... 1-143472

[51] Int. Cl.$^5$ ............. C09K 19/12; C07C 69/76
[52] U.S. Cl. ................... 252/299.65; 560/65; 560/81; 560/83; 560/102; 252/299.64; 252/299.66; 252/299.67
[58] Field of Search ............ 252/299.1, 299.6, 299.64, 252/299.65, 299.66, 299.67; 560/55, 59, 61, 62, 64, 65, 7.3, 77, 83, 102, 81

[56] References Cited

U.S. PATENT DOCUMENTS

| | | | |
|---|---|---|---|
| 4,421,632 | 5/1990 | Nakamura | 252/299.1 |
| 4,918,213 | 4/1990 | Nohia et al. | 558/271 |
| 4,973,738 | 11/1990 | Suzuki et al. | 560/80 |
| 5,046,823 | 9/1991 | Mori et al. | 359/56 |

FOREIGN PATENT DOCUMENTS

| | | |
|---|---|---|
| 327349 | 8/1989 | European Pat. Off. |
| 402233 | 12/1990 | European Pat. Off. |
| 0430205 | 6/1991 | European Pat. Off. |
| 63-307837 | 12/1988 | Japan |
| 643154 | 1/1989 | Japan |
| 1-139551 | 6/1989 | Japan |
| 1-213390 | 8/1989 | Japan |
| 62-205189 | 9/1989 | Japan |
| 240346 | 2/1990 | Japan |
| 2-153322 | 6/1990 | Japan |
| 2-173724 | 7/1990 | Japan |

2182037 5/1987 United Kingdom.

OTHER PUBLICATIONS

Y. Suzuki et al., New Fluorine–Containing Ferroelectric Liquid Crystal Compounds with Large Spontaneous Polarization And Fast Switching Time, 12th I.L.C.C. Abs. No. SYO2 (Aug. 15–19, 1988).

Japanese Journal of Applied Physics vol. 27, No. 5, May, 1988, pp. L729–L732, Tristable Switching in Surface Stabilized Ferroelectric Liquid Crystals with a Large Spontaneous Polarization, A. D. L. Chandani.

(List continued on next page.)

Primary Examiner—Robert L. Stoll
Assistant Examiner—Shean C. Wu
Attorney, Agent, or Firm—Cushman, Darby & Cushman

[57] ABSTRACT

(R)- and (S)-enantiomer composition represented by the formula (I) having sufficient high optical purity for exhibiting optically tristable states in S*(3) phase;

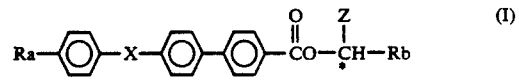

wherein Ra means a $C_5$–$C_{14}$ alkyl group or a $C_5$–$C_{14}$ alkoxy group, preferably a $C_5$–$C_{14}$ alkyl group, Rb means a $C_4$–$C_{12}$ normal alkyl group or a $C_4$–$C_{12}$ branched alkyl group, X means a

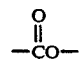

group or a

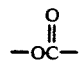

group, Z means a fluorine containing alkyl group, preferably a trifluoromethyl group and * shows an optically active carbon.

5 Claims, 8 Drawing Sheets

OTHER PUBLICATIONS

Liquid Crystals, 1989, vol. 6, No. 2, 167–174, New fluorine-containing ferroelectric liquid crystal compounds showing tristable switching by Y. Suzuki.

Patent Abstracts of Japan, vol. 13, No. 174 (C-589) [3522]—Apr. 25, 1989.

Liquid Crystals, vol. 6, No. 2, pp. 167–174 (Taylor and Francis Ltd., 1989) (p. 167—note paragraph 1, p. 168—note paragraph 2, p. 169—note FIG. 3).

Patent Abstracts of Japan, vol. 14, No. 254 (C-724) [4197]—May 31, 1990.

Yamawaki et al., Electro-Optical Properties of Fluorine-Containing Ferroelectric Liquid Crystal Cells, Proc. 9th International Display Research Conference, pp. 26–29 (Kyoto, Japan, Oct. 6–18, 1989).

Hayashi et al., Optical Purity Dependence of the Switching Behavior in Antiferroelectric Liquid Crystals, Proc. 13th International Liquid Crystal Conference, FER-73-P-W/5 (Jul. 22–27, 1990).

Takezoe et al, Antiferroelectric Phase and Tristable Switching in MHPOBC, Ferroelectrics 114, pp. 187–197 (1991).

Yamada et al, Phase Transition and Switching Behavior in a Fluorine-Containing Ferroelectric Liquid Crystas, Japanese Journal of Applied Physics 28:L pp. 1606–1608 (1989).

Goodby et al, A Chiral Induced Ferroelectric Liquid Crystal Phase Transition With A Vanishingly Small Enthapy, Liquid Crystals 3, pp. 1245–1254 (1988).

Takzoe et al, Antiferroelectric Phase and Tristable Switching in MHPOBC, Ferroelectrics 114, pp. 187–197 (1991).

Yamada et al, Phase Transition and Switching Behavior in a Fluorine-Containing Ferroelectric Liquid Crystas, Japanese Journal of Applied Physics 28:L pp. 1606–1608 (1989).

Goodby et al., A Chiral Induced Ferroelectric Liquid Crystal Phase Transition With a Vanishingly Small Enthapy, Liquid Crystals 3, pp. 1245–1254 (1988).

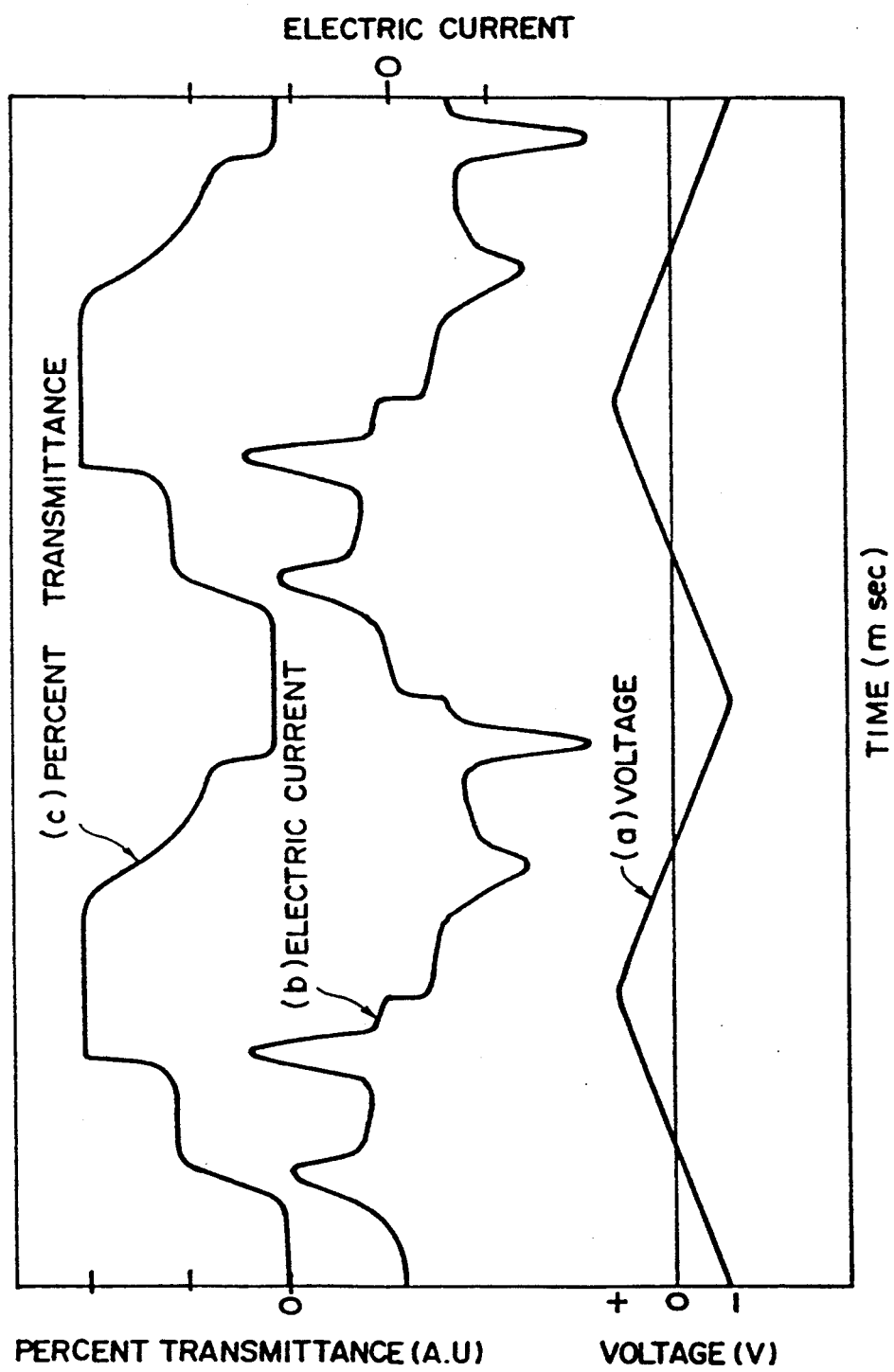

(R)-ISOMER 100
(S)-ISOMER 0

(R)-ISOMER 80
(S)-ISOMER 20

(R)-ISOMER 70
(S)-ISOMER 30

(R)-ISOMER 60
(S)-ISOMER 40

(R)-ISOMER 50
(S)-ISOMER 50

SYSTEM FOR MEASUREMENT OF ELECTROOPTICAL PROPERTIES

LIQUID CRYSTAL COMPOUNDS

This is a division and continuation-in-part application of Ser. No. 07/785,877 filed on Nov. 4, 1991, now U.S. Pat. No. 5,184,847, is a continuation application of Ser. No. 07/533,813 filed on Jun. 6, 1990 now abandoned.

The present invention relates to ferroelectric chiral smectic liquid crystal compounds which are effectively used for an indicative element or a photoelectric element utilizing response to an electric field. Furthermore, the present invention relates to antiferroelectric liquid crystal compounds having tristable molecular orientations in S* (3) phase which are also used for an indicative element or a photoelectric element utilizing response to an electric field.

There are electrooptical devices which employ nematic liquid crystals such as DSM, TN, G-H and STN. Useful applications of these devices are restricted, since response speed is as small as a few millisecond to some ten millisecond. This is due to the fact that torque for moving molecules is not so large, since the torque is mainly based on anisotropy of permittivity. Ferroelectric liquid crystals have been proposed which have response speed as large as a few second to some ten second and have large torque on the basis of $Ps \times E$ where Ps is a spontaneous polarization and E is an applied electric field (Meyer et al, Le Journal de Physique 36, 1975, L-69). Furthermore, there is proposed another ferroelectric liquid crystal (JP 63-307837) which shows smectic C phase or S*C phase but it is silent on optically tristable states hereinafter referred to.

One of high speed electrooptical devices which employ ferroelectric liquid crystals having S*c phase is that where a helical structure is released by wall force and a change is brought about in two molecular orientations which become parallel to the wall by use of polarity of applied electric fields (JP 56-107216). This is based on a premise that there is a compound having an ideal bistable states which show such electric field response wave as shown in FIG. 1. However, compounds which have been actually synthesized have no such electric field response wave as in FIG. 1 but they exhibited the response as shown in FIG. 2. When a compound having response wave as in FIG. 2 is used, for instance, in a switching circuit of light, desired result is hardly obtained by only a change in applied electric voltage between "ON" and "OFF", since transmittance slowly changes according to the change of applied electric voltage from a $\ominus$ side to a $\oplus$ side. In addition, bistable liquid crystals which have been synthesized hardly form a monodomain texture, i.e., an ideal molecular orientation at S*c phase stage where no electric field is applied to, but cause disclination or twist or irregularity in molecular orientation. It is very difficult to have ideal bistable orientations expressed in a large area. Another difficulty is that decrease in contrast or narrowing a field of view often appears in dynamic driving, since threshold voltage where luminance varies at a given level is small. The other difficulty is that there is no memory effect, since the bistable state liquid crystals actually synthesized have no hysteresis as in FIG. 1 but that as in FIG. 2. It is necessary to apply electric voltage of v3 in FIG. 2 throughout or to apply high frequency throughout, in order to have liquid crystals maintained stable response at S*c phase. Both lose a large amount of energy. Although high speed electrooptical devices liquid crystals are expected where strong combination between applied electric fields and molecular orientation brought about from ferroelectric liquid crystals is employed, any conventional devices leave many problems unsolved.

In the accompanying drawings,

FIG. 1 is an ideal but hypothetical hysteresis of bistable liquid crystals which have not yet been obtained, FIG. 2 is hysteresis of bistable liquid crystals actually prepared, FIG. 3 is hysteresis of the present tristable liquid crystals, where in FIGS. 1 to 3, a horizontal axis and a vertical axis show applied voltage and transmittance, respectively.

In FIG. 4, A is applied triangular wave voltage and B, C and D are optical response features of commercially available nematic liquid crystals, bistable liquid crystals and the present tristable liquid crystals, respectively.

FIG. 6 is tristable state switching of the present compound, wherein (a) is triangular wave voltage applied to a liquid crystal electrooptical element, (b) is polarization reversal current and (C) is change of percent light transmittance against the triangular wave voltage (a).

Figure 3:
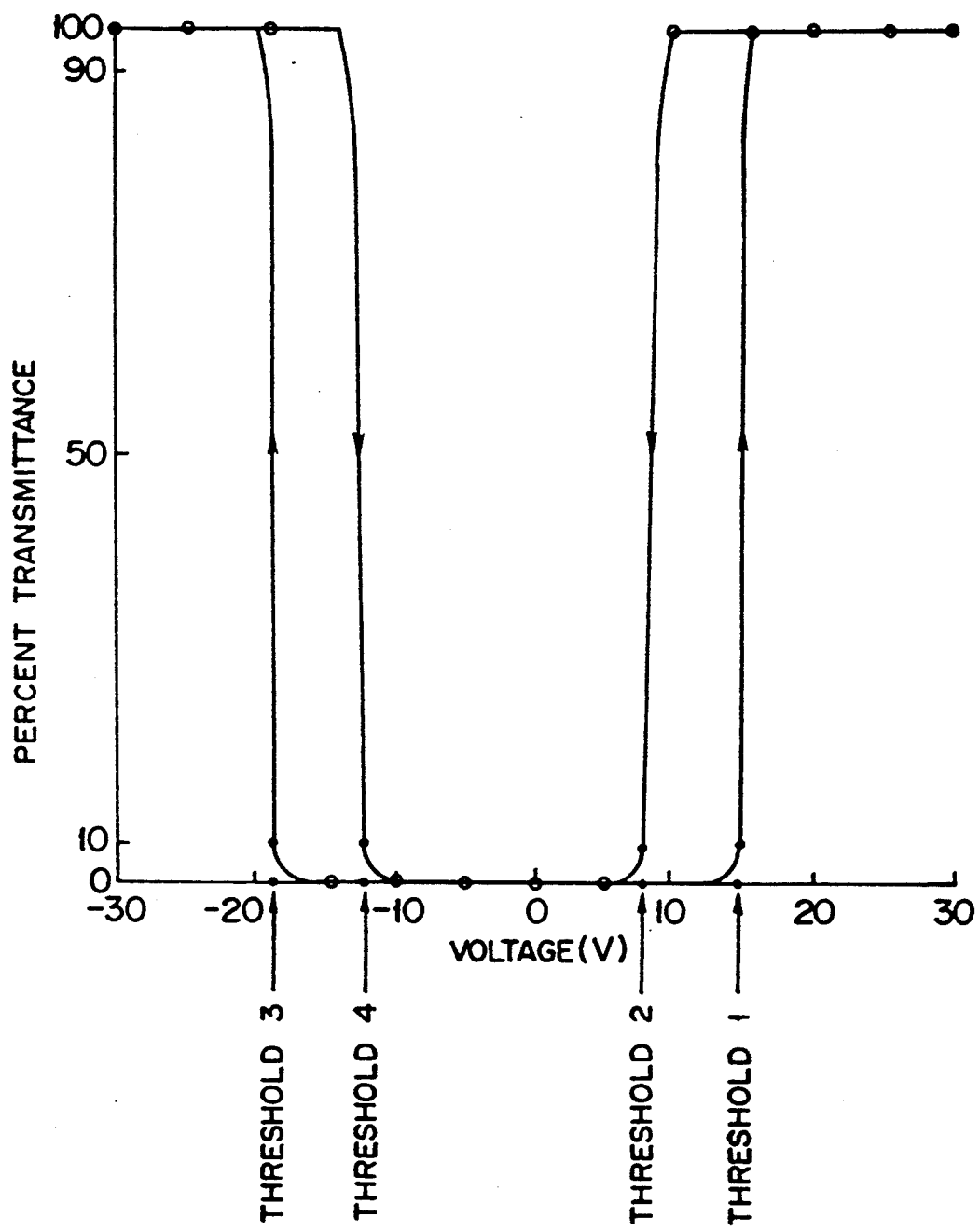

The present invention provides novel liquid crystal compounds which are used in liquid crystal electrooptical devices employing a tristable liquid crystals. The devices are able to show stable molecular orientation which expresses clear contrast in a field where no electric voltage is applied to, clear threshold and clear hysteresis as in FIG. 3. The devices are also ready to allow dynamic drive and make it possible to respond at high speed.

Figure 1:
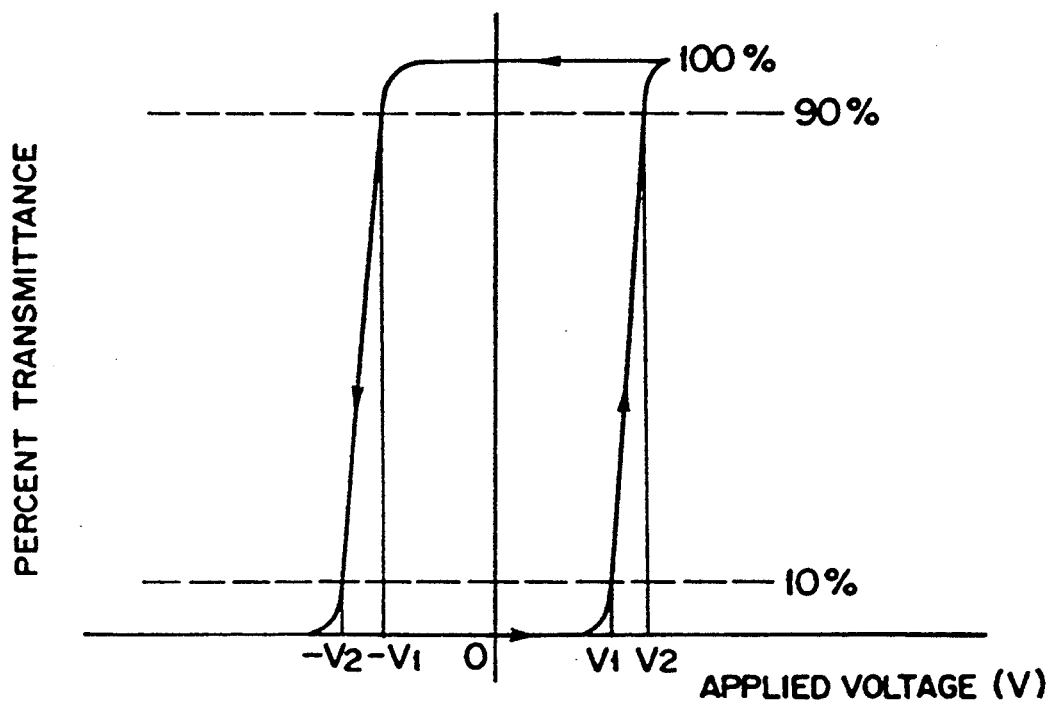
Figure 2:
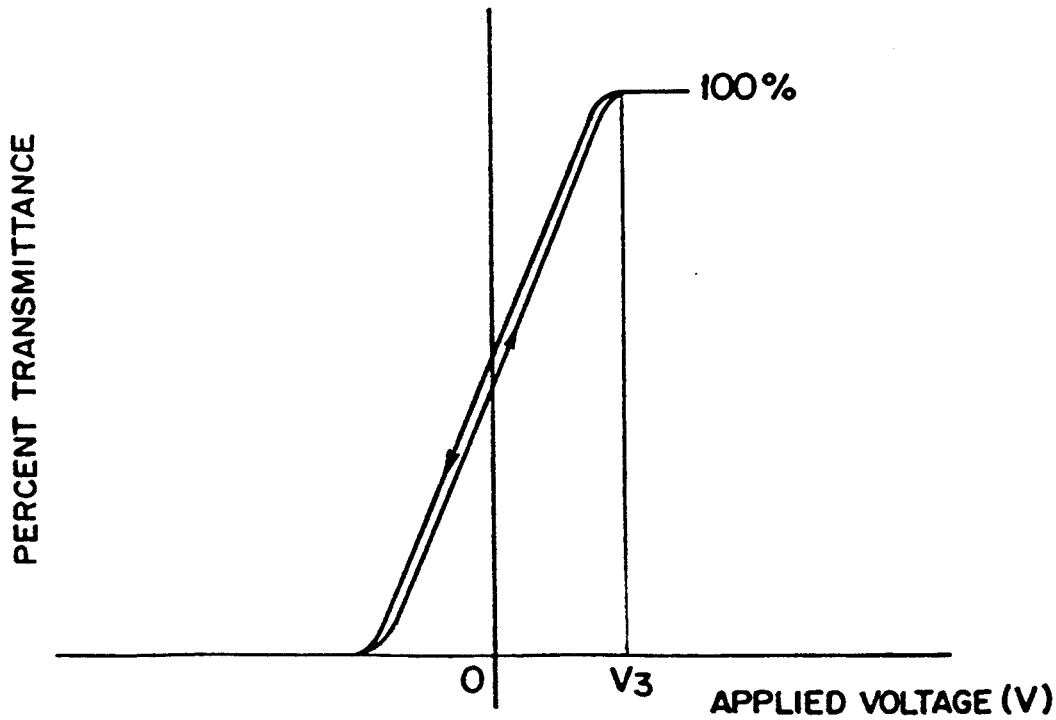
Figure 4:
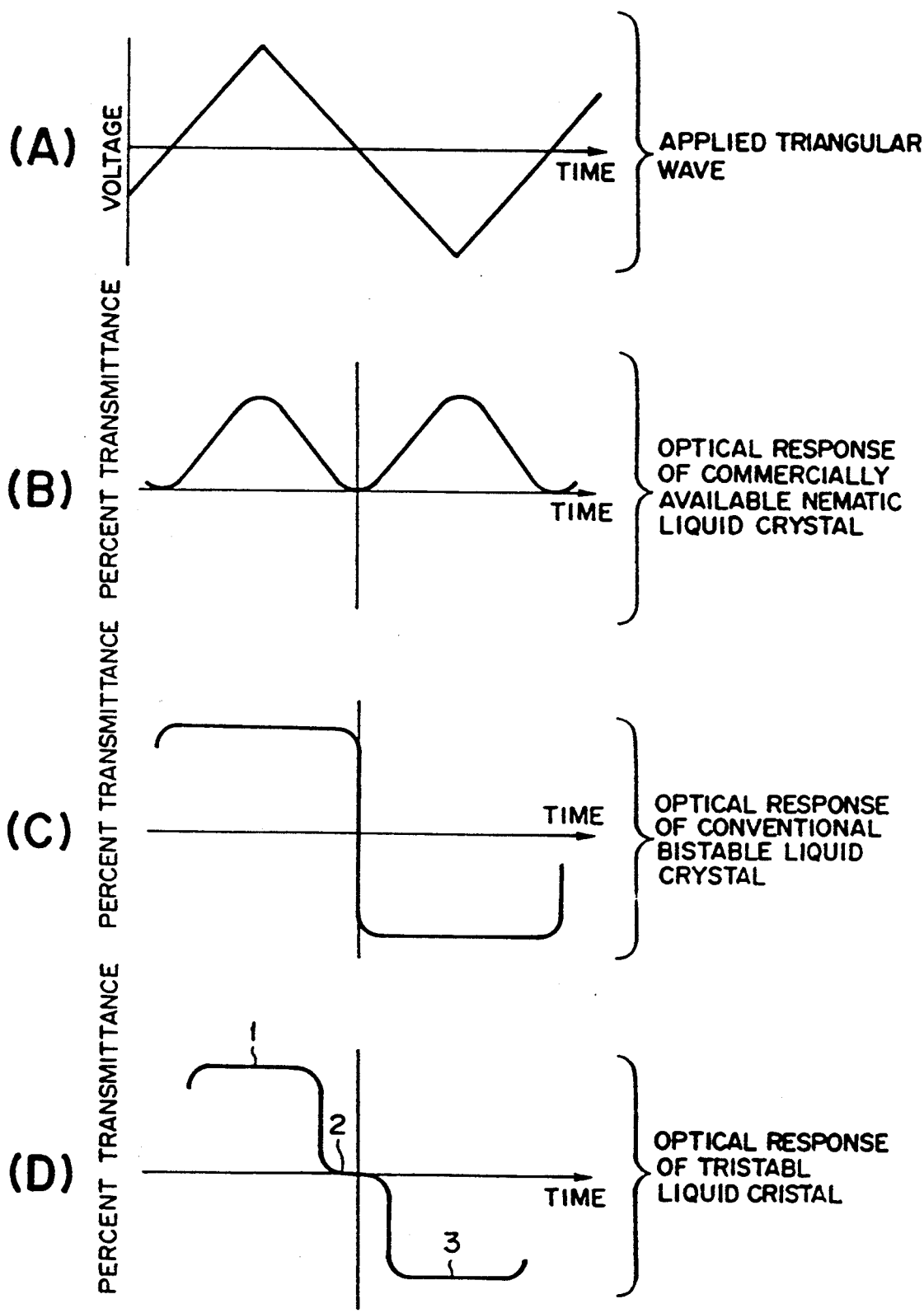
Figure 7A:
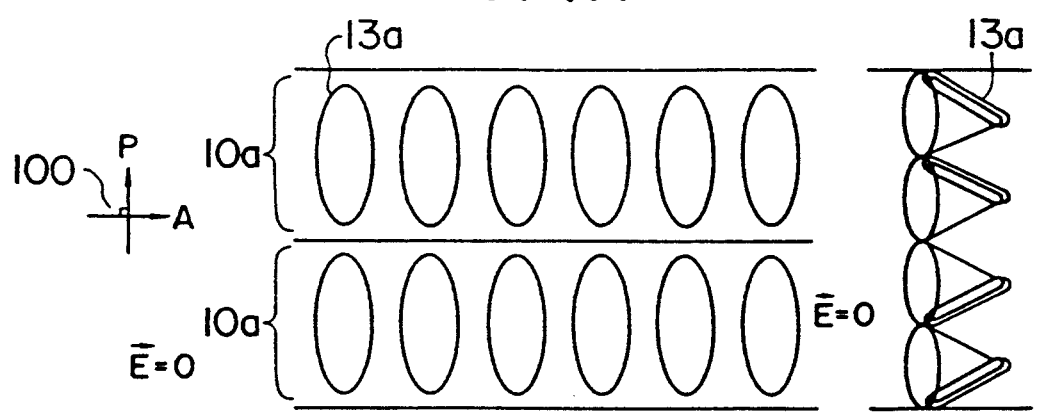
FIG. 7A-7C show the orientations of the present tristable liquid crystal compound when no electric field is applied, one of the direction of the electric field is applied and other direction of electric field is applied, respectively.
Figure 7B:
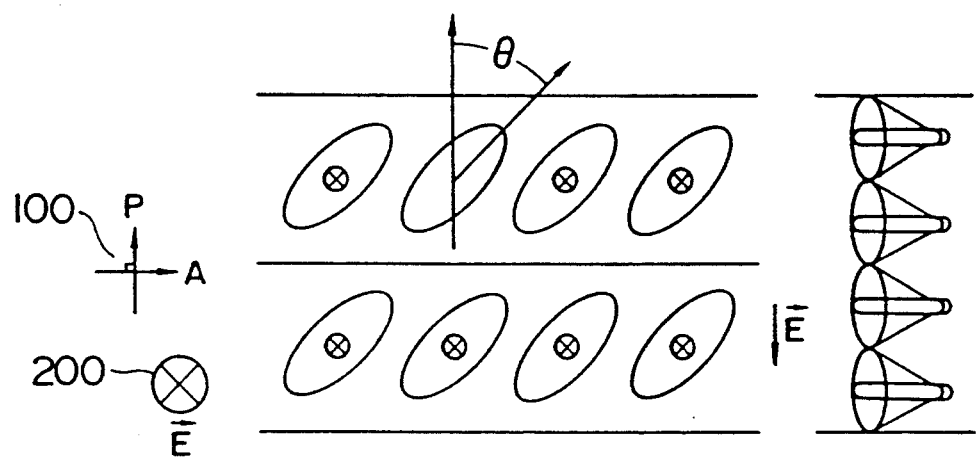
Figure 7C:
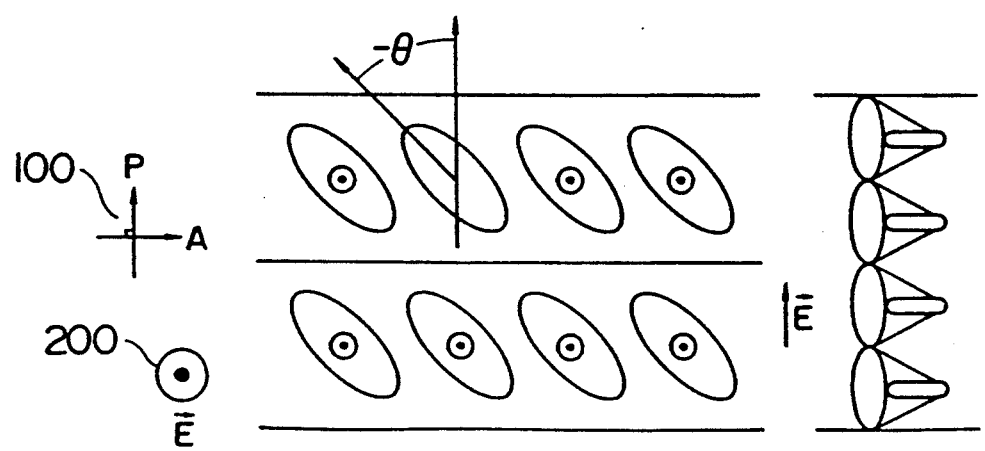
Figure 8A:
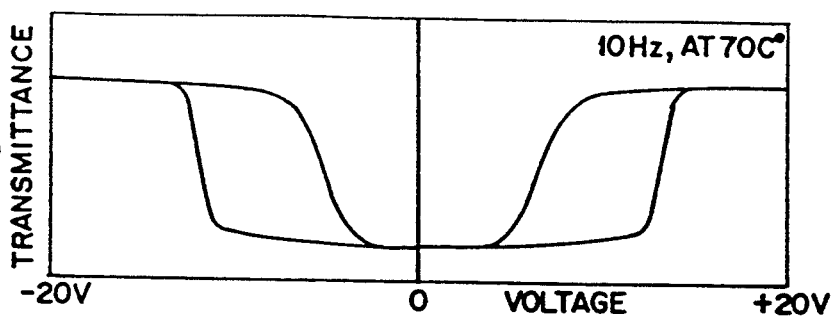
FIG. 8A-8E and FIG. 9 show the hysteresis curves of the composition of (R)-isomer of example 15 and (S)-isomer of example 18.
Figure 8B:
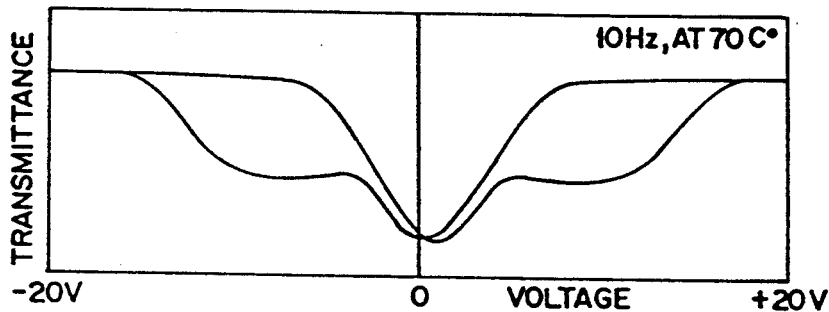
Figure 8C:
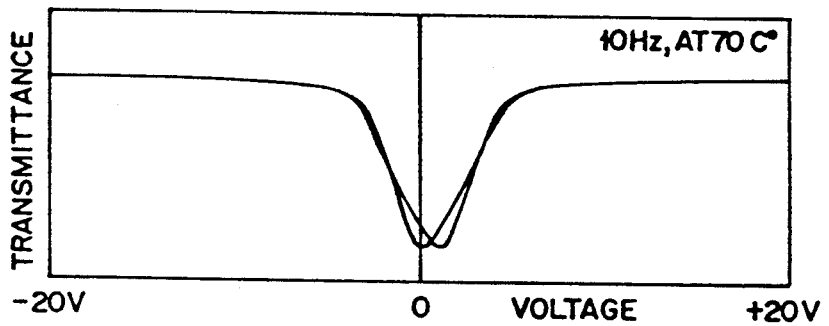
Figure 8D:
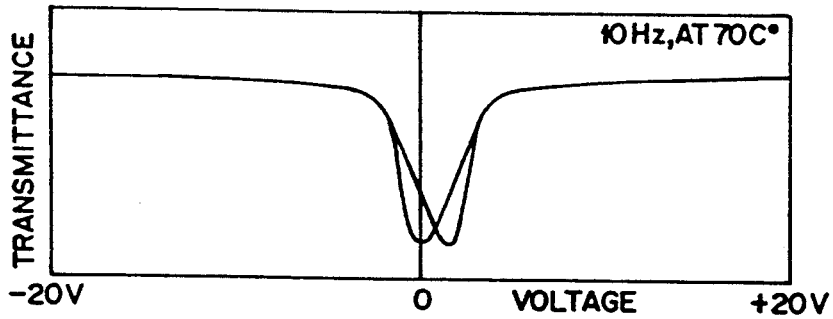
Figure 8E:
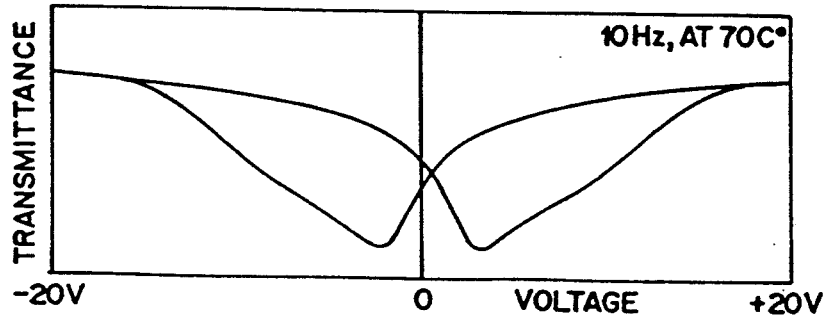
Figure 9:
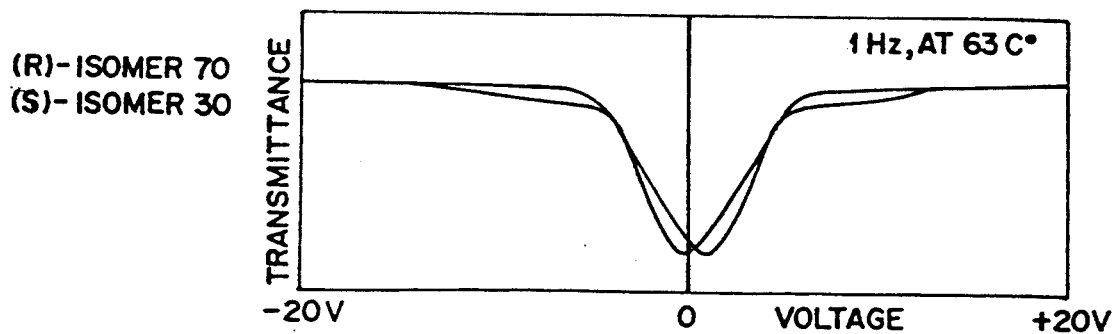
Figure 10:
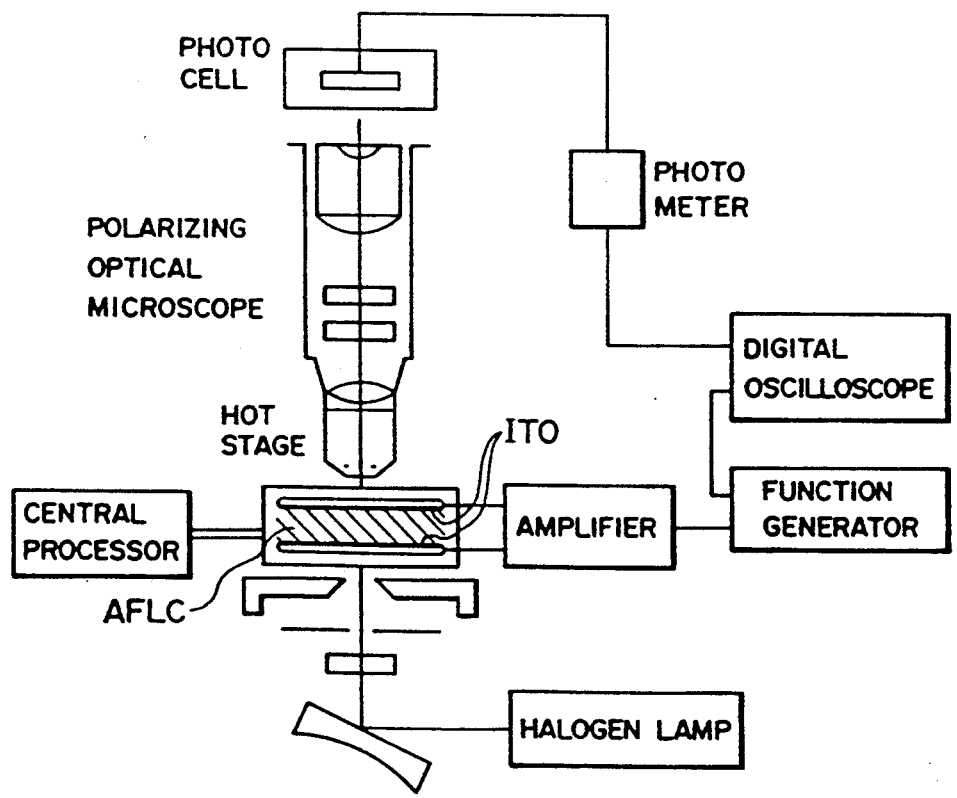
FIG. 10 shows an apparatus for measurement of electrooptical properties of liquid crystal compound.

A feature of the present novel antiferroelectric liquid crystals lies in a novel optically tristable states when the liquid crystal is in S*(3) phase which are greatly far from bistable states in chiral smectic C phase or S*c phase. The optically tristable state herein referred to mean that, when voltage in the form of a triangular wave as in FIG. 4A is applied to liquid crystal electrooptical devices where antiferroelectric liquid crystals are laid between the first electrode substrate plate and the second electrode substrate plate which is apart at a given space from the first one, the antiferroelectric liquid crystal shows the first stable molecular orientation and resulting the first optically stable state shown in FIG. 7A, and FIG. 4D 2, respectively, when electric voltage is zero. The antiferroelectric liquid crystal shows the second stable molecular orientation and resulting the second optically stable state shown in FIG. 7B, and FIG. 4D 1, respectively, in one of the direction of electric field and shows the third stable molecular orientation and resulting the third optically stable state shown in FIG. 7C, and FIG. 4D 3, respectively, in the other direction of electric field. On the other hand, commercially available conventional nematic liquid crystals and bistable state liquid crystals do not have such optically tristable states as shown in FIG. 4 (B) and (C).

Spontaneous polarizations of molecular of liquid crystal compounds have to be uniform in order to arrange the molecules of the liquid crystal compound in the same direction in response to electric field applied until tristable orientations are exhibited. In other words, according to optical purity of the liquid crystal compounds is higher, i.e. percentage of (R)-isomer or (S)-isomer is higher, tristable orientations and optically tristable state are easily exhibited. On the other hand, liquid crystal compound having low optical purity, even if the compound have the same chemical formula, do not exhibit the tristable orientations and optically tristable state, because spontaneous polarizations of the molecules are not uniform. Although Nakamura (U.S. Pat. No. 4,921,632) mentioned in Table 1 such several compounds as Compound he dose not refer to optical purities or optically tristable states in S*(3) phase, since the compound Nos. 3 and 5 would not have had enough optical purities to exhibit optically tristable sates.

The present tristable state antiferroelectric liquid crystals display has an epoch-making effect in view of the conventional nematic liquid crystals. A process for preparing the former is simple and not expensive so that a large size display can be produced. Al necessary for the former is a simple matrix indicative element. On the other hand, the latter conventional nematic liquid crystals and bistable stat liquid crystals need such a greatly complex system as active matrix and expensive processes. A display of large size is relative difficult to be produced.

According to the present invention, a liquid crystal compound having the formula given below is provided.

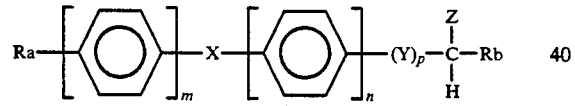

wherein Ra is a $C_{1-20}$ group or a $C_{1-20}$ alkoxy group, Rb is a $C_{1-20}$ normal alkyl group, A $C_{1-20}$ branched alkyl group, an aralkyl group or an alkoxy group, X is a

group or a

group Y is $$-\overset{O}{\underset{\|}{C}}O-$$

group or a $$-O\overset{O}{\underset{\|}{C}}-$$

group, Z is a fluorine-containing alkyl group or a halogen substituted group thereof, m is an integer from one to two, n is zero or an integer from one to two, p is zero or one but, when n is zero, p is zero, and * shows an optically active center.

Preferable alkyl and alkoxy groups represented by Ra and Rb have from 3 to 16 carbon atoms, Y is preferably $$-\overset{O}{\underset{\|}{C}}O-$$

or $$-O\overset{O}{\underset{\|}{C}}-$$

and Z is preferably $CF_3$.

Preferable compounds are

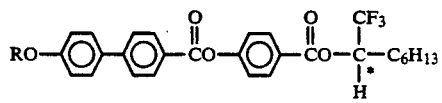

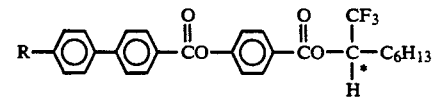

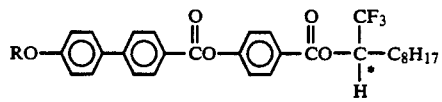

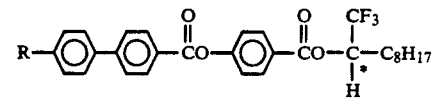

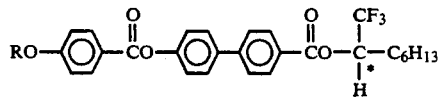

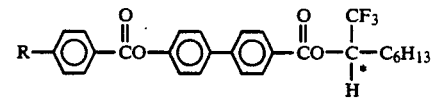

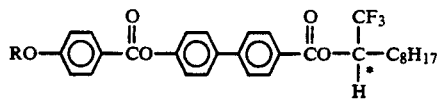

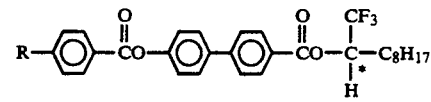

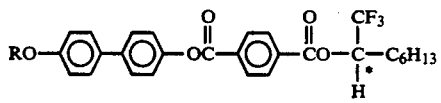

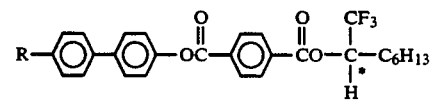

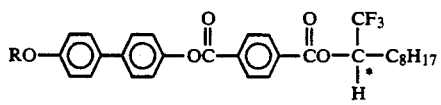

-continued

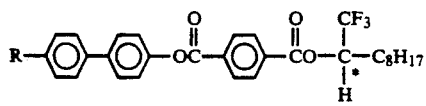

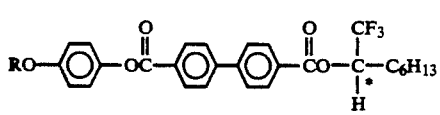

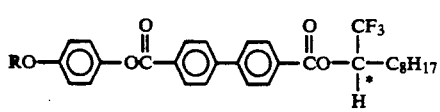

wherein R is a $C_{3-16}$ alkyl group.

Specifically, the present liquid crystal compound is represented by the following formula;

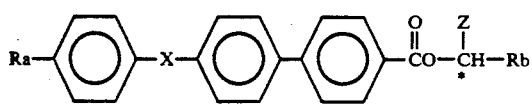

wherein Ra means a $C_5-C_{14}$ alkyl group or a $C_5-C_{14}$ alkoxyl group, Rb means a $C_4-C_{12}$ normal alkyl group, X means a $$-\overset{O}{\underset{\|}{C}}O-$$

group or a

group, Z means a fluorine-containing alkyl group and * shows an optically active center, which has sufficient optical purity for exhibiting optically tristable states in S*(3) phase.

Synthesis of the Compounds (1) Optical active 4'-(1,1,1-trifluoro-2-alkyloxycarbonyl)biphenyl 4-n-alkyloxybenzoate 4'-Benzyloxybiphenyl-4-carboxylic acid chloride is allowed to react with optically active 1,1,1-trifluoro-2-alkanol to prepare 1,1,1-trifluoro-2-alkyl 4-benzyloxybiphenyl-4-carboxylate which is subjected to hydrogenation to obtain 1,1,1-trifluoro-2-alkyl 4'-hydroxybiphenyl-4-carboxylate. The alkyl ester is then allowed to react with 4-n-alkyloxyphenylcarboxylic acid chloride to obtain the titled compound.

(2) Optically active 4-alkyloxyphenyl 4'-(1,1,1-trifluoro-2-alkyloxycarbonyl)biphenyl-4-carboxylate 4,4'-Biphenyldicarboxylic acid chloride is allowed to react with optically active 1,1,1-trifluoro-2-alkanol to prepare 4'-(1,1,1-trifluoro-2-alkyloxycarbonyl)-biphenyl-4-carboxylic acid which is allowed to react with 4-alkoxyphenol to obtain the titled compound.

The following examples explain the present invention.

EXAMPLE 1

1) Synthesis of 1,1,1-trifluoro-2-decyl 4-benzyloxybenzoate

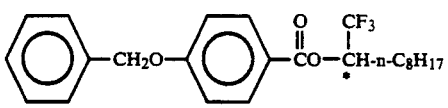

To a solution of 4-benzyloxybenzoic acid chloride (1.23 g) in methylene chloride (10 ml) was added by little and little under ice-cooling a solution of optically active 1,1,1-trifluoro-2-decanol (0.96 g), dimethylaminopyridine (0.55 g) and triethylamine (0.48 g) in methylene chloride (20 ml). The mixture was left to stand overnight at room temperature in order to effect a reaction before the mixture obtained was poured in ice-water. Extraction was effected with methylene chloride and the extracted phase was washed with dilute aqueous hydrochloric acid solution, water, 1N aqueous sodium carbonate solution and water in due order before it was dried over anhydrous magnesium sulfate. The solvent was distilled off to obtain a crude product which was purified by toluene/silica from ethanol to obtain the titled compound (1.84 g).

2) Synthesis of 1,1,1-trifluoro-2-decyl-4-hydroxybenzoate.

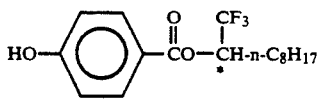

A solution of the compound obtained in 1) in ethanol (15 ml) was subjected to hydrogenation under hydrogen atmosphere in the presence of 10% Pd on carbon (0.36 g) to obtain the titled compound (1.43 g).

3) Synthesis of 4-(1,1,1-trifluoro-2-decyloxycarbonyl)phenyl 4'-n-decyloxybiphenyl-4-carboxylate

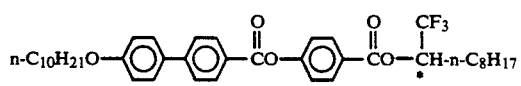

4-n-Decyloxybiphenyl-4-carboxylic acid (1.20 g) with excess thionyl chloride was heated for six hours under refluxing. Thionyl chloride unaltered was distilled off to obtain 4-n-decyloxybiphenylcarboxylic acid chloride.

To a solution of the said acid chloride in methylene chloride (12.0 ml) was added by little and little under ice-cooling a solution of 1,1,1-trifluorodecyl 4-hydroxybenzoate prepared in 2) above (1.00 g), triethylamine (0.32 g) and dimethylaminopyridine (0.37 g) in methylene chloride (30 ml). The mixture was left to stand overnight at room temperature, before the mixture was was poured in ice water.

Extraction was carried out with methylene chloride and the extracted phase was washed with dilute aqueous hydrochloric acid solution, water, aqueous sodium carbonate solution, and water in due order before it was dried over anhydrous sodium sulfate. The solvent was distilled off to obtain a crude product which was purified by toluene/silica gel column chromatography until the optically active titled compound (1.53 g) was obtained.

Phase transition temperature of the product was observed after the product was recrystallized from absolute ethanol.

EXAMPLE 2

4-n-(1,1,1-trifluoro-2-decyloxycarbonyl)phenyl 4'-n-octyloxybiphenyl-4-carboxylate

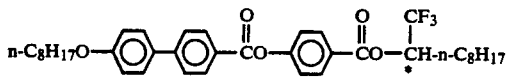

EXAMPLE 3

4-n-(1,1,1-trifluoro-2-decyloxycarbonyl)phenyl 4'-n-nonyloxybiphenyl-4-carboxylate

EXAMPLE 5

4-n-(1,1,1-trifluoro-2-decyloxycarbonyl)phenyl 4-n-dodecyloxybiphenyl-4-carboxylate

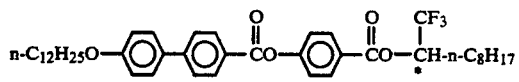

Example 1s were repeated except that 4'-n-octyloxybiphenyl-4-carboxylic acid, 4'-n-nonyloxybiphenyl-4-carboxylic acid, 4'-n-undecyloxybiphenyl-4-carboxylic acid and 4'-n-dodecyloxybiphenyl-4-carboxylic acid were used in place of the 4-n-decyloxybiphenylcarboxylic acid to obtain the titled compounds, respectively.

Specific rotations $[\alpha]_D^{20}$ and phase transition temperatures of the objective compounds of the present invention are shown below.

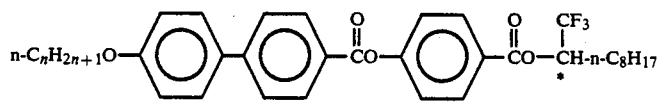

| | Specific rotation (°) | Phase transition temperature (°C.) |
|---|---|---|
| n = 8 | +33.2 | Cry $\underset{<67.5}{\overset{79.2>}{\rightleftarrows}}$ S*(3) $\underset{<103}{\overset{104>}{\rightleftarrows}}$ S*c $\underset{<105.0}{\overset{105.5>}{\rightleftarrows}}$ S$_A$ $\underset{<113.5}{\overset{114.0>}{\rightleftarrows}}$ Iso |
| n = 9 | +32.0 | Cry $\underset{<31.7}{\overset{63.8>}{\rightleftarrows}}$ S*(3) $\underset{<96}{\overset{96.6>}{\rightleftarrows}}$ S*c $\underset{<98}{\overset{98>}{\rightleftarrows}}$ S$_A$ $\underset{<105.1}{\overset{105.5>}{\rightleftarrows}}$ Iso |
| n = 10 | +30.8 | Cry $\underset{<10.0}{\overset{44.6>}{\rightleftarrows}}$ S*(3) $\underset{<95.0}{\overset{95.8>}{\rightleftarrows}}$ S$_A$ $\underset{<100.3}{\overset{100.5>}{\rightleftarrows}}$ Iso |
| n = 11 | +30.5 | Cry $\underset{<21.2}{\overset{45.8>}{\rightleftarrows}}$ S*(3) $\underset{<91.6}{\overset{91.6>}{\rightleftarrows}}$ S$_A$ $\underset{<95.9}{\overset{95.9>}{\rightleftarrows}}$ Iso |
| n = 12 | +31.9 | Cry $\underset{<30.4}{\overset{56.3>}{\rightleftarrows}}$ S*(3) $\underset{<90.4}{\overset{90.4>}{\rightleftarrows}}$ S$_A$ $\underset{<92.8}{\overset{92.8>}{\rightleftarrows}}$ Iso |

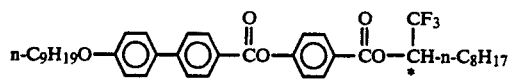

EXAMPLE 4

4-n-(1,1,1-trifluoro-2-decyloxycarbonyl)phenyl 4'-n-undecyloxybiphenyl-4-carboxylate

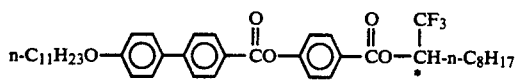

The phase transition temperatures were measured by DSC and hot stage microscope-observation. Herein S*(3) means a phase having optically tristable states.

EXAMPLE 6

4-(1,1,1-trifluoro-2-decyloxycarbonyl)phenyl 4'-n-octylbiphenyl-4-carboxylate

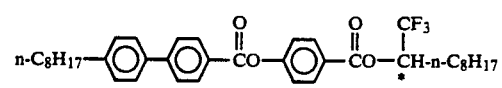

EXAMPLE 7

4-(1,1,1-trifluoro-2-decyloxycarbonyl)phenyl
4'-n-nonylbiphenyl-4-carboxylate

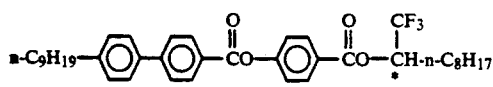

EXAMPLE 8

4-(1,1,1-trifluoro-2-decyloxycarbonyl)phenyl
4'-n-undecylbiphenyl-4-carboxylate

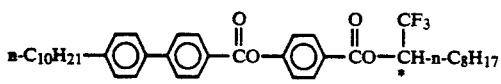

EXAMPLE 9

4-(1,1,1-trifluoro-2-decyloxycarbonyl)phenyl
4'-n-dodecylbiphenyl-4-carboxylate

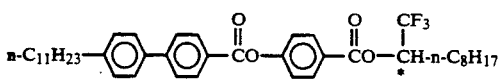

Example 1s were repeated except that 4'-n-octylbiphenyl-4-carboxylic acid, 4'-n-nonylbiphenyl-4-carboxylic acid, 4'-n-decylbiphenyl-4-carboxylic acid and 4'-n-undecylbiphenyl-4-carboxylic acid were used in place of the 4-n-decyloxybiphenylcarboxylic acid to obtain the titled compounds, respectively.

EXAMPLE 10

4-(1,1,1-trifluoro-2-octylcarbonyl)phenyl
4'-n-nonylbiphenyl-4-carboxylate

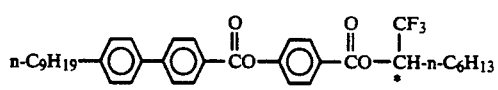

EXAMPLE 11

4-(1,1,1-trifluoro-2-octyloxycarbonyl)phenyl
4'-n-decylbiphenyl-4-carboxylate

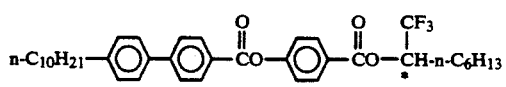

EXAMPLE 12

4-(1,1,1-trifluoro-2-octyloxycarbonyl)phenyl
4'-n-undecylbiphenyl-4-carboxylate

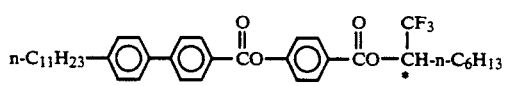

Example 1s were repeated except that 4'-n-nonylbiphenyl-4-carboxylic acid, 4'-n-decylbiphenyl-4-carboxylic acid and 4'-n-undecylbiphenyl-4-carboxylic acid were used in place of the 4-n-decyloxybiphenylcarboxylic acid to obtain the titled compounds, respectively.

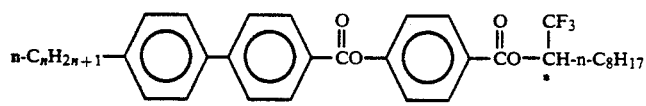

| | Specific rotation (°) | Phase transition temperature (°C.) |
|---|---|---|
| n = 8 | +32.7 | Cry $\underset{31.3}{\overset{41.8}{\rightleftarrows}}$ S*(3) $\underset{62}{\overset{63}{\rightleftarrows}}$ S*c $\underset{62.5}{\overset{64.0}{\rightleftarrows}}$ S$_A$ $\underset{67.5}{\overset{68.2}{\rightleftarrows}}$ Iso |
| n = 9 | +33.1 | Cry $\underset{16.8}{\overset{32.1}{\rightleftarrows}}$ S*(3) $\underset{61.8}{\overset{61.8}{\rightleftarrows}}$ S$_A$ $\underset{65.0}{\overset{65.3}{\rightleftarrows}}$ Iso |
| n = 10 | +31.0 | Cry $\overset{38.2}{\nearrow}$ S$_1$ $\overset{40.1}{\searrow}$ $\underset{10.0}{\rightarrow}$ S*(3) $\underset{55.6}{\overset{55.9}{\rightleftarrows}}$ S*c $\underset{56.8}{\overset{57.2}{\rightleftarrows}}$ S$_A$ $\underset{58.2}{\overset{58.8}{\rightleftarrows}}$ Iso |
| n = 11 | +31.1 | Cry $\overset{34.7}{\rightarrow}$ S*(3) $\underset{56.0}{\overset{56.0}{\rightleftarrows}}$ S*c $\underset{56.6}{\overset{56.6}{\rightleftarrows}}$ Iso ; $-20 \diagdown$ S$_1$ $\diagup -15$ |

The phase transition temperatures were measured by DSC and hot stage microscope-observation.

Specific rotations $[\alpha]_D^{20}$ and phase transition temperatures of the objective compounds of the present invention are shown below.

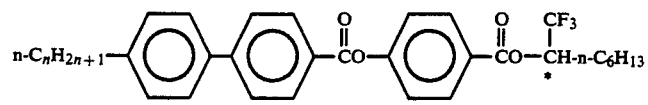

| | Specific rotation (°) | Phase transition temperature (°C) |
|---|---|---|
| n = 9 | +29.5 | Cry $\xrightleftharpoons[5.7]{28.5}$ S*(3) $\xrightleftharpoons[71]{71}$ S*c $\xrightleftharpoons[71.6]{72.6}$ S$_A$ $\xrightleftharpoons[74.1]{73.6}$ Iso |
| n = 10 | +30.1 | Cry $\xrightleftharpoons[5.0]{43.0}$ S*(3) $\xrightleftharpoons[65.9]{66.0}$ S$_A$ $\xrightleftharpoons[67.2]{67.6}$ Iso |
| n = 11 | +26.8 | Cry $\xrightleftharpoons[-20]{-13}$ S*(3) $\xrightleftharpoons[65.0]{65.9}$ S$_A$ $\xrightleftharpoons[66.4]{66.5}$ Iso |

The phase transition temperature were measured by DSC and hot stage microscope-observation.

EXAMPLE 13

Synthesis of 4'-n-dodecyloxybiphenyl-(4) 4-(1,1,1-trifluoro-2-decyloxycarbonyl)benzoate (1) Synthesis of mono-ester of 1,1,1-trifluoro-2-decylterephthalic acid

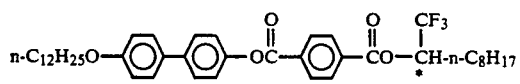

To a solution of terephthalic acid chloride (11.2 g) in methylene chloride (50 ml) were added by little and little under ice-cooling optically active 1,1,1-trifluoro-2-decanol (10.0 g) and pyridine (13.0 g). The mixture was left to stand overnight at room temperature and washed with dilute aqueous hydrochloric acid solution, water, 1N aqueous sodium bicarbonate solution and water, in due order. The organic layer was separated, dried over anhydrous magnesium sulfate and subjected to distillation under reduced pressure to remove the solvent. The crude product obtained was purified by toluene/silica gel chromatography and then recrystallized from ethanol to obtain the titled compound (3.3 g).

4'-n-Dodecyloxybiphenyl-(4) 4-(1,1,1-trifluoro-2-decyloxycarbonyl)benzoate 1,1,1-Trifluoro-2-decylterephthalate (3.3 g) obtained in 1), 4-dodecyloxy-4'-hydroxybiphenyl (3.9 g), dicyclohexylcarbodiimide (31.9 g) and dimethylaminopyridine (0.3 g) were poured in tetrahydrofuran (100 ml) and the mixture was left to stand overnight at room temperature.

Some amount of the tetrahydrofuran was distilled off under reduced pressure and the residue was poured in ice water. Extraction was made with methylene chloride and the extract was washed with 1N aqueous sodium bicarbonate solution, water, dilute aqueous hydrogen chloride solution and water, in due order, until the extract was neutral. The extract was dried over anhydrous sodium sulfate and was subjected to distillation to remove the solvent to obtain a crude product which was purified by toluene/silica gel chromatography and recrystallized from ethanol to obtain the optically active titled compound (1.3 g).

Specific rotation $[\alpha]_D^{20} = +28.8°$

Phase transition temperature (°C) by DSC and hot stage microscope-observation

Cry $\xrightleftharpoons[53.9]{72}$ S*(3) $\xrightleftharpoons[74]{74.5}$ S*c $\xrightleftharpoons[77]{78}$ S$_A$ $\xrightleftharpoons[100.0]{100.5}$ Iso

EXAMPLE 14

4'-(1,1,1-trifluoro-2-octyloxycarbonyl)biphenyl-(4) 4-n-octyloxybenzoate

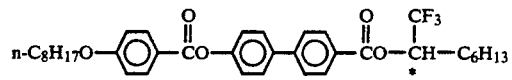

4-(1,1,1-trifluoro-2-octyloxycarbonyl)-4'-hydroxybiphenyl (0.5 g) was allowed to react with 4-n-octyloxybenzoic acid (0.33 g) in the presence of dicyclocarbodiimide (0.3 g), a few pieces of dimethylaminopyridine and tetrahydrofuran (30 ml) to obtain a crude product (0.4 g), which was purified by silica gel column choreography (hexane:ethyl acetate=10:0.5) and then recrystallized from ethanol to obtain optically active titled compound (0.4 g).

Specific rotation $[\alpha]_D^{20} = 39.2$

Phase transition temperatures (°C) which were observed under a polarizing microscope using a hot stage were as follows.

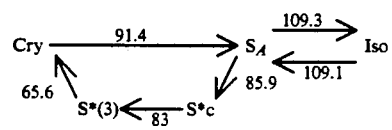

EXAMPLE 15

(R)-(+)-4-(1,1,1-trifluoro-2-octyloxycarbonyl)biphenyl-(4) n-octyloxybenzoate

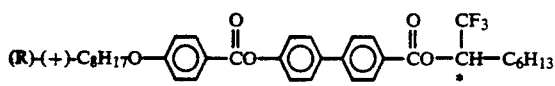

1) Synthesis of (R)-(+)-4-(1,1,1-trifluoro-2-octyloxycarbonyl)-4'-benzyloxybiphenyl

To a solution of 4-benzyloxybiphenyl-4'-carboxylic acid chloride (1.23 g) in methylene chloride (10 ml) was added by little and little under ice-cooling a solution of (R)-(+)-1,1,1-trifluoro-2-octanol (0.96 g) ($[\alpha]_D^{22.5} = +20.1$, optical purity 96.3%ee), dimethylaminopyridine (0.55 g) and triethylamine (0.48 g) in methylene chloride (20 ml). The mixture was left to stand over-night at room temperature in order to complete the reaction before the mixture obtained was poured in ice-water.

Extraction was effected with methylene chloride and the extracted phase was washed with dilute aqueous hydrochloric acid solution, water, 1N aqueous sodium carbonate solution and water in this order before it was dried over anhydrous magnesium sulfate. The solvent was distilled off to obtain a crude product which was purified by toluene/silica gel column chromatography and further recrystallized from ethanol to obtain the titled compound (1.84 g).

2) Synthesis of (R)-(+)-4-(1,1,1-trifluoro-2-octyloxycarbonyl)-4'-hydroxybiphenyl

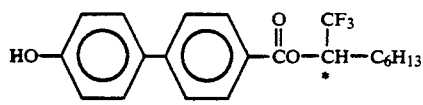

A solution of the compound obtained in 1) in ethanol (15 ml) was subjected to hydrogenation under hydrogen atmosphere in the presence of 10% Pd on carbon (0.36 g) to obtain the titled compound (1.43 g).

3) Example 14 was repeated except that (R)-(+)-4-(1,1,1-trifluoro-2-octyloxycarbonyl)-4'-hydroxy-biphenyl (0.5 g) was used in place of 4-(1,1,1-trifluoro-2-octyloxycarbonyl)-4'-hydroxybiphenyl to obtain the desired compound (0.4 g).

Specific rotation: $[\alpha]_D^{20} = +39.6$

Specific rotation of the compound of example 14 ($[\alpha]_D^{20} = +39.2$) is almost same as that of the compound of example 16. This shows optical purity of the compound of example 14 was about 96.3%ee, since an optical purity of a liquid crystal compound depends only on the optical purity of the alcohol as starting compound.

Phase transition temperatures (°C.) which were observed under a polarizing microscope using a hot stage were as follows.

```
       91.0
Cry ─────────→ S_A ←───── Iso
                    109.7
    69.6↘    ↙85.5
       S*(3)←─── S*c
            81.7
```

EXAMPLE 16

4-n-octyloxyphenyl 4'-(1,1,1-trifluoro-2-octyloxycarbonyl)biphenyl-4-carboxylate

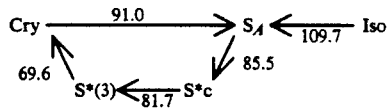

To a solution of 4,4'-biphenyldicarboxylic acid dichloride (1.3 g) and 4-n-octyloxyphenol (1.0 g) in methylene chloride (40 ml) were added triethylamine (0.5 g) and dimethylaminopyridine (0.032 g). The mixture was stirred for 24 hours at room temperature before it was poured in water. Extraction was made with methylene chloride and the extract was washed with dilute aqueous hydrochloric acid solution, water, dilute aqueous sodium carbonate solution and water, in this order, and dried over anhydrous magnesium sulfate. After the solvent was distilled off, the residue was purified by silica gel column chromatography (developer:hexane:ethyl acetate=10:0.5) and recrystallized from ethanol to obtain the titled compound (0.8 g)

Specific rotation: $[\alpha]_D^{20} = +41.0$

Phase transition temperature by DSC and hot stage microscope-observation

```
      67        71        75        99.0
Cry ─────→ S*(3) ─────→ S*c ─────→ S_A ─────→ Iso
    ←─34.8   ←─69      ←─73      ←─98.2
```

EXAMPLE 17

(R)-(+)-4-n-octyloxyphenyl 4'-(1,1,1-trifluoro-2-octyloxycarbonyl)-biphenyl-4-carboxylate

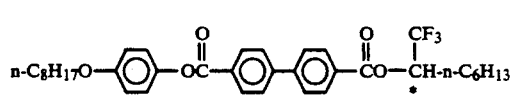

1) Synthesis of (R)-(+)-4-(1,1,1-trifluoro-2-octyloxycarbonyl)biphenyl-4'-carboxylic acid

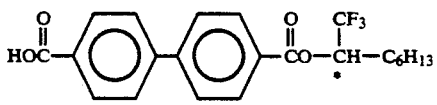

To a solution of 4,4'-biphenyldicarboxylic acid dichloride (1.3 g) in a methylene chloride (10 ml) was added by little by little under ice-cooling a solution of (R)-(+)-1,1,1-trifluoro-2-octanol (0.96 g) ($[\alpha]_D^{22.5} = +20.1$, optical purity 96.3%ee), dimethylaminopyridine (0.55 g) and tri-ethylamine (0.48 g) in methylene chloride (20 ml). The mixture was left to stand overnight at room temperature in order to effect a reaction before the mixture obtained was poured in ice-water.

Extraction was effected with methylene chloride and the extracted phase was washed with dilute aqueous hydrochloric acid solution, then water before it was dried over anhydrous magnesium sulfate. The solvent was distilled off to obtain a crude product which was purified by toluene/silica gel column chromatography and further recrystallized from ethanol to obtain 4'-(1,1,1-trifluoro-2-octyloxycarbonyl)biphenyl-4-carboxylic acid (1.84 g).

2) Synthesis of (R)-(+)-4-octyloxyphenyl 4'-(1,1,1-trifluoro-2-octyloxycarbonyl)biphenyl-4-carboxylate 4'-(1,1,1-trifluoro-2-octyloxycarbonyl)biphenyl-4-carboxylic acid obtained in 1) was allowed to react with thionyl chloride in methylene chloride to obtain 4'-(1,1,1-trifluoro-2-octyloxycarbonyl)biphenyl-4-carbonylchloride.

To a solution of 4'-(1,1,1-trifluoro-2-octyloxycarbonyl)biphenyl-4-carbonylchloride (1.3 g) and 4-n-octyloxyphenol (1.0 g) in methylene chloride (40 ml) were added triethylamine (0.5 g) and dimethylaminopyridine (0.032 g). The mixture was stirred for 24 hours at room temperature before it was poured in water. Extraction was made with methylene chloride and the extract was washed with dilute aqueous sodium carbonate solution and water, in this order and dried over anhydrous magnesium sulfate. After the solvent was distilled off, the residue was purified by silica gel column chromatography (developer hexane ethyl acetate 10 0.5) and recrystallized from ethanol to obtain the titled compound (0.8 g).

Specific rotation $[\alpha]_D^{20} = +41.5$

Specific rotation of the compound of example 16 $[\alpha]_D^{20} = +41.0$) is almost same as that of the compound of example 17. The optical purity of the compound of example 16 was about 96.3%ee, since an optical purity of a liquid crystal compound depends only on the optical purity of the starting alcohol compound.

Phase transition temperatures (°C.) which were observed under a polarizing microscope using a hot stage were as follows.

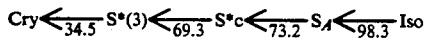

EXAMPLE 18

(S)-(−)-4-(1,1,1-trifluoro-2-octyloxycarbonyl)biphenyl-(4) n-octyloxybenzoate

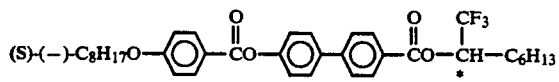

Example 15 was repeated except using (S)-(−)-1,1,1-trifluoro-2-octanol (0.96 g) ($[\alpha]_D^{22.5} = -23.0$, optical purity 94.9%ee) in place of (R)-(+)-1,1,1-trifluoro-2-octanol to obtain (S)-(−)-4-(1,1,1-trifluoro-2-octyloxycarbonyl)biphenyl-(4) n-octyloxybenzoate.

Specific Rotation $[\alpha]_D^{20} = -36.2$

Phase transition temperatures (°C.) which were observed under a polarizing microscope using a hot stage were as follows.

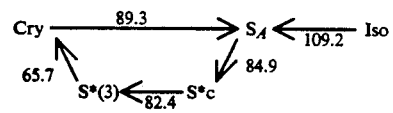

EXAMPLE 19

In a cell consisting of two ITO-coated glass plates with thin rubbed polyimid film was packed the liquid crystal compound obtained in Example 14 between the glass plates so that molecular parallel direction and Polarizers are arranged in the same direction when minus voltage was applied to and in the form of an isotropic phase to prepare a liquid crystal thin film cell.

The cell was slowly cooled with a rate of 0.1 to 1.0° C/min. until SA phase was oriented. Rectangular wave (±30 V, 10 Hz) was applied to in order to detect electrooptical response by a polarizing microscope with photomultiplier.

Figure 5:
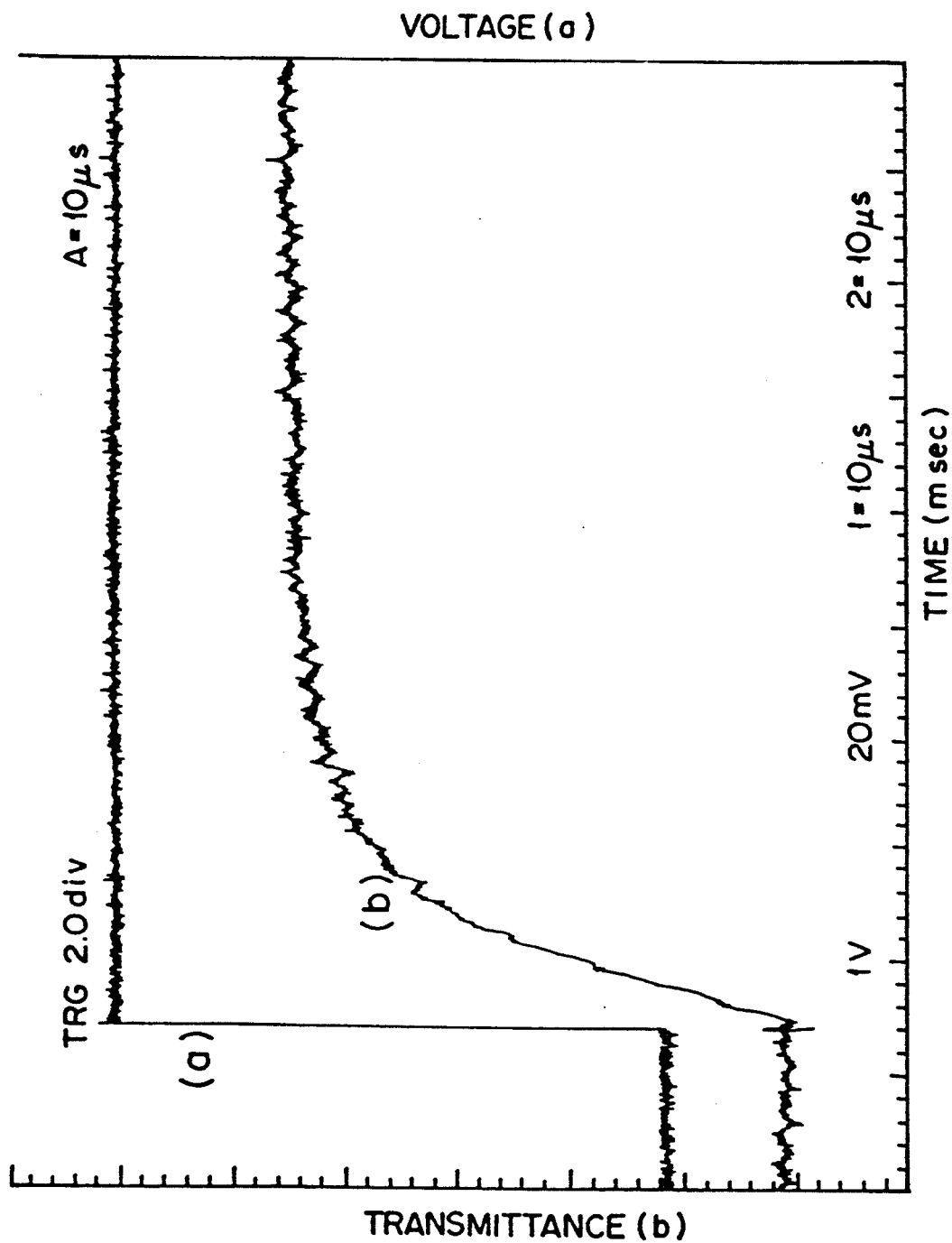
FIG. 5 shows electroclinic effect, wherein (a) is AC voltage and (b) is change of percent light transmittance against the AC voltage (a) above.

Electroclinic effect (b) in FIG. 5 which was optically responsible against applied field (a) was observed at the SA phase. The same effect as above was observed as to the compounds of examples 2-18.

EXAMPLE 20

A liquid crystal cell prepared in the same manner as in example 19 was put in a polarizing microscope with photomultiplier where two polarizing plate were crossed with a right angle so that an angle between a parallel axis of molecule and a polarizer was 22.5°. The liquid crystal cell was slowly cooled with a rate of 0.1 to 1.0° C./min. to an S*(3) phase. Further cooling showed a change as in FIG. 6 where triangular wave voltage (a) of ±30 V, 10 Hz was applied to within the temperature range of 95.0° to 10.0° C.

The FIG. 6 shows change of transmittance (c) from a dark phase at the minus range of applied voltage to a clear phase at the plus range via a medium phase at the zero range, and the corresponding peaks (b) of switching current peak. Three stable orientation states of liquid crystal molecules were confirmed. The same phenomenon as above were observed in the compounds of examples 2 to 18.

EXAMPLE 21

Phase Transition Temperatures and Hysteresis Curves

The compound of example 15, i.e., (R)-(+)-4-(1,1,1-trifluoro-2-octyloxycarbonyl)biphenyl-(4) n-octyloxybenzoate (hereinafter referred to as R-isomer) and the compound of example 18, i.e., (S)-(−)-4-(1,1,1-trifluoro-2-octyloxycarbonyl)biphenyl-(4) n-octyloxybenzoate (hereinafter referred to as S-isomer) are blended as in table 1. Phase transition temperatures of each blended compositions and hysteresis curves were obtained and they are shown in table 1 and FIG. 8A-8E and FIG. 9.

Hysteresis curves of the compositions were measured with the following apparatuses:

A polarizing optical microscope (OLYMPUS model BHSP).

A photo meter (SANKEI SPS-5A)

A photo cell (Hamamatsu R-636)

A high speed power Amplifier (NF 4005)

A digitizing oscilloscope (YHP, HP 54501A)
A function generator (YHP HP 3314A)
A hot stage (Mettler FP82)
A central processor (Mettler FP80)

Sample Preparation

Sample cells were constructed from two glass substrates with patterned ITO (indium-tin-oxide). The substrates were initially spin-coated with polyimides (LX500 produced by Hitachi Kasei Ltd.) and were then rubbed with nylon cloths on a rotating cylinder under several kinds of rubbing conditions. The sample cells were composed of two substrates thus processed, the rubbing directions of which were mutually parallel. The cell spacing was 1.6 μm. After the cell was filled with antiferroelectric liquid crystal by capillary suction in the isotropic phase, it was cooled slowly (−0.1−−1° C./min.) to the S*(3) phase.

Evaluation of Samples

The orientation of the sample was observed under a polarizing microscope. In order to control the sample temperature, a hot stage (Mettler FP82) and a central processor (Mettler FP80) were used. The electrooptical properties were evaluated by the measurement system, as shown in FIG. 13. The light transmitted through the sample cell was detected by a photo cell. Pulses were synthesized in a function generator and were supplied to the sample cells through a bipolar amplifier.

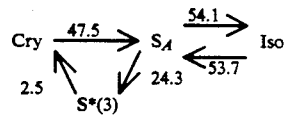

EXAMPLE 23

(S)-(−)-4-(1,1,1-trifluoro-2-octyloxycarbonyl)biphenyl-(4) 4-n-octylbenzoate

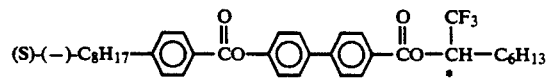

Example 15 was repeated except using (S)-(−)-1,1,1-trifluoro-2-octanol (1.11 g) in 1) and 4-n-octylbenzoic acid (0.36 g) in 3) in place of (R)-(+)-1,1,1-trifluoro-2-octanol and 4-octyloxybenzoic acid, respectively.

Phase transition temperatures (°C.) which were observed under a polarizing microscope using a hot stage were as follows.

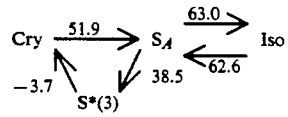

TABLE 1

| Blend | | Phase Transition Temperatures (°C.) (cooling) | | | | Specific rotation | Optical Purity |
|---|---|---|---|---|---|---|---|
| (R)-isomer | (S)-isomer | Cry ← | S*(3) ← | S*c ← | S_A ← Iso | $[\alpha]_D^{20}$ | % ee |
| 100 | 0 | 69.6 | 81.7 | 85.5 | 109.7 | +39.6° | 96.3 |
| 90 | 10 | 64.5 | 80.9 | 81.7 | 110.1 | +33.6° | 81.6 |
| 80 | 20 | 63.5 | 76.5 | 81.3 | 110.3 | +26.1° | 63.4 |
| 70 | 30 | 63.1 | 67.6 | 81.8 | 110.4 | +19.6° | 47.7 |
| 60 | 40 | 63.7 | no S*(3) | 82.2 | 110.7 | +8.9° | 21.6 |
| 50 | 50 | 60.0 | no S*(3) | 82.1 | 110.8 | +0.19° | 0.46 |

Compositions in which R-isomer is 70–100% exhibit S*(3) phase and optically tristable states. And compositions in which R-isomer is 80–100% exhibit clear hysteresis curves.

EXAMPLE 22

(R)-(30)-4-(1,1,1-trifluoro-2-decyloxycarbonyl)biphenyl-(4) 4-n-octylbenzoate

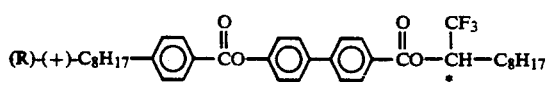

Example 15 was repeated except using (R)-(+)-1,1,1-trifluoro-2-decanol (1.11 g) ($[\alpha]_D^{20}=+23.1$) in 1) and using 4-n-octylbenzoic acid (0.36 g) in 3) in place of (R)-(+)-1,1,1-trifluoro-2-octanol and 4-n-octyloxybenzoic acid, respectively.

Phase transition temperatures (°C.) which were observed under a polarizing microscope using a hot stage were as follows.

EXAMPLE 24

4-n-Octylphenyl 4'-(1,1,1-trifluoro-2-octyloxycarbonyl)biphenyl-4-carboxylate

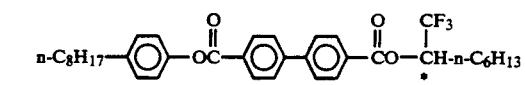

1) Synthesis of mono ester of 4'-(1,1,1-trifluoro-2-octyloxycarbonyl)biphenyl-4'carboxylic acid To a solution of 4,4'-biphenyldicarboxylic acid dichloride (1.3 g) and 4-n-octylphenol (0.95 g) in methylene chloride (40 ml) were added triethylamine (0.5 g) and dimethylaminopyridine (0.032 g). The mixture was stirred for 24 hours at room temperature before it was poured in water. Extraction was made with methylene chloride and the extract was washed with dilute aqueous hydrochloric acid solution, water, dilute aqueous sodium carbonate solution and water, in this order, and dried over anhydrous magnesium sulfate. After the solvent was distilled off, the residue was purified by silica gel column chromatography (developer:hexane:ethyl acetate=10:0.5) and recrystallized from ethanol to obtain the titled compound (0.76 g)

2) 4-n-Octylphenyl 4'-(1,1,1-trifluoro-2-octyloxycarbonyl)biphenyl-4-carboxylate 4'- 4'-(1,1,1-Trifluoro-2-octyloxycarbonyl)biphenyl-4'-carboxylic acid (0.76 g) obtained in 1), 4-octyl-4'-hydroxyphenyl (0.4 g), dicyclohexylcarbodiimide (0.43 g) and dimethylaminopyridine (0.04 g) were poured in tetrahydrofuran (20 ml) and the mixture was left to stand overnight at room temperature.

Some amount of the tetrahydrofuran was distilled off under reduced pressure and the residue was poured in ice water. Extraction was made with methylene chloride and the extract was washed with 1N aqueous sodium bicarbonate solution, water, dilute aqueous hydrogen chloride solution and water, in due order, until the extract was neutral. The extract was dried over anhydrous sodium sulfate and was subjected to distillation to remove the solvent to obtain a crude product which was purified by toluene/silica gel chromatography and recrystallized from ethanol to obtain the optically active titled compound (0.3 g).

Phase transition temperatures (°C.) which were observed under a polarizing microscope using a hot stage were as follows.

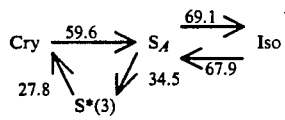

We claim:

1. (R)- and (S)-enantiomer composition represented by the formula (I) having sufficient high optical purity for exhibiting optically tristable states in S*(3) phase;

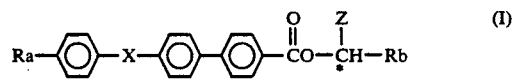

wherein Ra means a $C_5$-$C_{14}$ alkyl group, Rb means a $C_4$-$C_{12}$ normal alkyl group or a $C_4$-$C_{12}$ branched alkyl group, X means a

group or a

group, Z means a fluorine containing alkyl group and * shows an optically active carbon.

2. (R)- and (S)-enantiomer composition represented by the formula (I) having sufficient high optical purity for exhibiting optically tristable states in S*(3) phase;

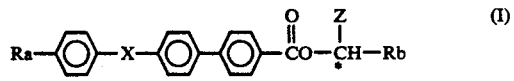

wherein Ra means a $C_5$-$C_{14}$ alkoxy group; Rb means a $C_4$-$C_{12}$ normal alkyl group or a $C_4$-$C_{12}$ branched alkyl group, X means a

group Z means a fluorine containing alkyl group and * an optically active carbon.

3. (R)- and (S)-enantiomer composition according to claim 1, wherein X means

group.

4. (R)- and (S)-enantiomer composition according to claim 1, wherein X means

group.

5. (R)- and (S)-enantiomer composition according to claim 1, 2, 3 or 4, wherein Z means $CF_3$ or $C_2F_5$.

* * * * *